(12) United States Patent
Rothfuss

(10) Patent No.: US 10,144,152 B2
(45) Date of Patent: Dec. 4, 2018

(54) FEEDSTOCKS FOR ADDITIVE MANUFACTURING AND METHODS FOR THEIR PREPARATION AND USE

(71) Applicant: EMPIRE TECHNOLOGY DEVELOPMENT LLC, Wilmington, DE (US)

(72) Inventor: Christopher J. Rothfuss, Laramie, WY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/508,416

(22) PCT Filed: Jul. 29, 2015

(86) PCT No.: PCT/US2015/042692
§ 371 (c)(1),
(2) Date: Mar. 2, 2017

(87) PCT Pub. No.: WO2016/036449
PCT Pub. Date: Mar. 10, 2016

(65) Prior Publication Data
US 2017/0291327 A1 Oct. 12, 2017

Related U.S. Application Data

(63) Continuation of application No. 14/475,360, filed on Sep. 2, 2014, now Pat. No. 9,586,371.

(51) Int. Cl.
| | | |
|---|---|---|
| B29B 9/12 | (2006.01) |
| B29B 9/16 | (2006.01) |
| B29C 37/00 | (2006.01) |
| B29C 59/00 | (2006.01) |
| B29C 59/16 | (2006.01) |
| B29C 64/00 | (2017.01) |
| B29C 64/106 | (2017.01) |
| B29C 70/64 | (2006.01) |
| B29C 71/04 | (2006.01) |
| B33Y 10/00 | (2015.01) |
| B33Y 70/00 | (2015.01) |
| C08K 9/10 | (2006.01) |
| C08L 55/02 | (2006.01) |
| C08L 69/00 | (2006.01) |
| C08L 79/08 | (2006.01) |
| B29K 69/00 | (2006.01) |
| B29K 55/02 | (2006.01) |
| B29K 105/00 | (2006.01) |
| B29C 35/08 | (2006.01) |
| B29C 59/02 | (2006.01) |

(52) U.S. Cl.
CPC .......... *B29B 9/16* (2013.01); *B29B 9/12* (2013.01); *B29C 37/0082* (2013.01); *B29C 59/005* (2013.01); *B29C 64/00* (2017.08); *B29C 64/106* (2017.08); *B29C 70/64* (2013.01); *B29C 71/04* (2013.01); *B33Y 10/00* (2014.12); *B33Y 70/00* (2014.12); *C08K 9/10* (2013.01); *C08L 55/02* (2013.01); *C08L 69/00* (2013.01); *C08L 79/08* (2013.01); *B29B 2009/125* (2013.01); *B29B 2009/163* (2013.01); *B29C 59/16* (2013.01); *B29C 2035/0822* (2013.01); *B29C 2035/0827* (2013.01); *B29C 2035/0833* (2013.01); *B29C 2059/028* (2013.01); *B29K 2055/02* (2013.01); *B29K 2069/00* (2013.01); *B29K 2105/0076* (2013.01)

(58) Field of Classification Search
CPC ....... B29B 9/16; B29B 9/12; B29B 2009/125; B29B 2009/163; B33Y 70/00; B33Y 10/00; C08K 9/10; C08L 55/02; C08L 69/00; C08L 79/08; B29C 71/04; B29C 70/64; B29C 37/0082; B29C 59/005; B29C 64/00; B29C 64/106; B29C 2035/0822; B29C 2035/0827; B29C 2059/028; B29K 2069/00; B29K 2055/02; B29K 2105/0076
See application file for complete search history.

(56) References Cited

U.S. PATENT DOCUMENTS

| | | |
|---|---|---|
| 4,182,641 A | 1/1980 | Fitts |
| 5,264,061 A | 11/1993 | Juskey et al. |
| 5,863,486 A | 1/1999 | Ozaki et al. |
| 6,171,687 B1 | 1/2001 | Leung et al. |

(Continued)

FOREIGN PATENT DOCUMENTS

| | | |
|---|---|---|
| WO | 2012070052 A1 | 5/2012 |
| WO | 2013030064 A1 | 3/2013 |

OTHER PUBLICATIONS

"3D Printer Maker Stratasys Expands Automated Support-Removal Process for Polycarbonate Material;" Nov. 28, 2011, Accessed at http://investors.stratasys.com/common/mobile/iphone/releasedetail.cfm?ReleaseID=627524&CompanyID=AMDA-FNA1K&mobileid=, accessed on Mar. 6, 2017, pp. 3.

(Continued)

*Primary Examiner* — Patrick D Niland
(74) *Attorney, Agent, or Firm* — IP Spring

(57) ABSTRACT

Feedstocks for additive manufacturing are provided. The feedstock may include a matrix material, and one or more capsules disposed in the matrix material, wherein the one or more capsules are configured to be removable from a surface portion when the matrix material is solidified to form one or more cavities in the surface portion. Methods of depositing the feedstocks and objects formed from the feedstocks are also provided.

24 Claims, 3 Drawing Sheets

(56) References Cited

U.S. PATENT DOCUMENTS

| | | | |
|---|---|---|---|
| 7,910,041 | B1 | 3/2011 | Priedeman et al. |
| 8,728,717 | B2 | 5/2014 | Kohl et al. |
| 2005/0082710 | A1 | 4/2005 | Oriakhi et al. |
| 2007/0056163 | A1 | 3/2007 | Lu et al. |
| 2008/0254276 | A1 | 10/2008 | James et al. |
| 2009/0220613 | A1 | 9/2009 | Odidi et al. |
| 2009/0302493 | A1* | 12/2009 | Kessler ............... B29C 47/862 264/175 |
| 2011/0270412 | A1 | 11/2011 | Bellan et al. |
| 2011/0312080 | A1 | 12/2011 | Hatton et al. |

OTHER PUBLICATIONS

"FDM Thermoplastics 30 print durable parts in production-grade materials," accessed at http://www.stratasys.com/materials/fdm, Accessed on Mar. 6, 2017, 2 pages.

"Physical Properties of Salt & Sodium Chloride," Accessed at http://archive.is/Llhz, accessed on Mar. 6, 2017, pp. 2.

"PC-ABS for Fortus 3D Production Systems," 2011, Accessed at http://web.archive.org/web/20121031092549/https://www.solidconcepts.com/content/pdfs/material-specifications/fdm-pc-abs.pdf, Accessed on Mar. 6, 2017, pp. 2.

"Real Parts Tm Mean Real Possibilities," 2012, Accessed at http://web.archive.org/web/20140619054018/http://proto3000.com/assets/uploads/PDFs/StratasysProductBrochures/FortusOverallSystemSpecSheet.pdf, Accessed on Mar. 6, 2017, pp. 4.

Andersson, L. and Bergström, L., "Gas-filled microspheres as an expandable sacrificial template for direct casting of complex-shaped macroporous ceramics," Journal of the European Ceramic Society, vol. 28, No. 15, pp. 2815-2821 (Jun. 9, 2008).

Bellan, L. M. et al., "Fabrication of an artificial 3-dimensional vascular network using sacrificial sugar structures," Soft Matter, vol. 5, No. 7, pp. 1354-1357 (Feb. 9, 2009).

Chen, Y-C., and Kohl, P.A., "Photosensitive sacrificial polymer with low residue," Microelectronic Engineering, vol. 88, No. 10, pp. 3087-3093 (Oct. 2011).

Guo, N. and Leu, M. C., "Additive manufacturing: Technology, applications and research needs," Frontiers of Mechanical Engineering, vol. 8, Issue 3, pp. 215-243 (May 2013).

Higashihara, T. et al., "Recent progress in negative-working photosensitive and thermally stable polymers," Reactive and Functional Polymers, vol. 73, No. 2, pp. 303-315 (2013).

Hornick, J. and Roland, D. "Many 3D Printing Patents are Expiring Soon: Here's a Round UP & Overview of Them," on Dec. 29, 2013, Accessed at http://web.archive.org/web/20140327123116/http://3dprintingindustry.com/2013/12/29/many-3d-printing-patents-expiring-soon-heres-round-overview/, Accessed on Jun. 18, 2014, pp. 10.

Hourston, D. J., "Degradation of Plastics and Polymers," in Shreir's Corrosion, Oxford, Elsevier, pp. 2369-2386 (2010).

International Search Report and Written Opinion for International Application No. PCT/US2015/042692 dated Oct. 28, 2015, pp. 10.

Kozlov, P. V. and Burdygina, G. I., "The structure and properties of solid gelatin and the principles of their modification," Polymer, vol. 24, No. 6, pp. 651-666 (1983).

Kumar, S. and Kruth, J. P., "Composites by rapid prototyping technology," Materials & Design, vol. 31, No. 2, pp. 850-856 (2010).

Levy, G. N. et al., "Rapid Manufacturing and Rapid Tooling With Layer Manufacturing (Lm) Technologies, State of the Art and Future Perspectives," CIRP Annals—Manufacturing Technology, vol. 52, pp. 589-609 (2003).

Miller-Chou, B. A. and Koenig, J. L., "A review of polymer dissolution," Progress in Polymer Science, vol. 28, No. 8, pp. 1223-1270 (2003).

Vaezi, M. et al., "A review on 3D micro-additive manufacturing technologies," The International Journal of Advanced Manufacturing Techology, vol. 67, No. 5-8, pp. 1721-1754 (2013).

Vaezi, M. et al., "Multiple material additive manufacturing—Part 1: a review," Virtual and Physical Prototyping, vol. 8, No. 1, pp. 19-50 (2013).

Wu, X. et al., "Lithographic Characteristics and Thermal Processing of Photosensitive Sacrificial Materials," Journal of The Electrochemical Society, vol. 149, No. 10, pp. G555-G561 (2002).

* cited by examiner

FEEDSTOCKS FOR ADDITIVE MANUFACTURING AND METHODS FOR THEIR PREPARATION AND USE

CROSS-REFERENCE TO RELATED APPLICATIONS

The present application is a U.S. National Stage filing under 35 U.S.C. § 371 of International Application Serial No. PCT/US2015/042692, filed on Jul. 29, 2015, and entitled "FEEDSTOCKS FOR ADDITIVE MANUFACTURING AND METHODS FOR THEIR PREPARATION AND USE" which claims priority to U.S. patent application Ser. No. 14/475,360 filed on Sep. 2, 2014. The disclosure of International Patent Application No. PCT/US2015/042692 and U.S. patent application Ser. No. 14/475,360 are incorporated herein by reference in their entirety.

BACKGROUND

Additive manufacturing (AM) is a class of fabrication techniques that use a layer-by-layer construction approach to create complex three-dimensional shapes. Additive manufacturing processes can be highly flexible and can provide considerably higher material efficiencies than traditional subtractive manufacturing techniques. As a result, additive manufacturing has been the subject of considerable innovation and research, resulting in a large variety of available processes and products. One of the challenges in additive manufacturing include the creation of strong bonds between material layers. There is therefore a desire for methods and feedstocks that can enable strong interlayer adhesion between the materials layers.

SUMMARY

A feedstock for additive manufacturing is disclosed. The feedstock includes: a matrix material; and one or more capsules disposed in the matrix material, wherein the one or more capsules are configured to be removable from at least a surface portion of the matrix material when the matrix material is solidified, to form one or more cavities in the surface portion.

A method of bonding material layers in an additive manufacturing process is also disclosed. The method includes: forming a layer of a first feedstock having a first matrix material and one or more capsules disposed in the first matrix material; removing the one or more first capsules from at least a surface portion of the first matrix material when the matrix material is solidified, to form one or more cavities in the surface portion; and forming a layer of a second feedstock having a second matrix material, on at least a portion of the first matrix material, wherein prior to solidification of the second matrix material, the second matrix material at least partially infiltrates the one or more cavities in the surface portion of the first matrix material.

A method of making one or more capsules for disposing into a matrix material of a feedstock is also disclosed. The method includes: forming a sacrificial material into one or more particles; and coating the one or more particles with a coating material.

A method of making a feedstock for additive manufacturing is also disclosed. The method includes: mixing one or more capsules into a matrix material, wherein the one or more capsules are configured to be removable from at least a surface portion of the matrix material when the matrix material is solidified, to form one or more cavities in the surface portion.

A three-dimensional object is also disclosed. The three-dimensional object includes: a first matrix material; and a second matrix material on at least a portion of the first matrix material, wherein the first matrix material has a surface portion that includes one or more cavities that are at least partially infiltrated by the second matrix material.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
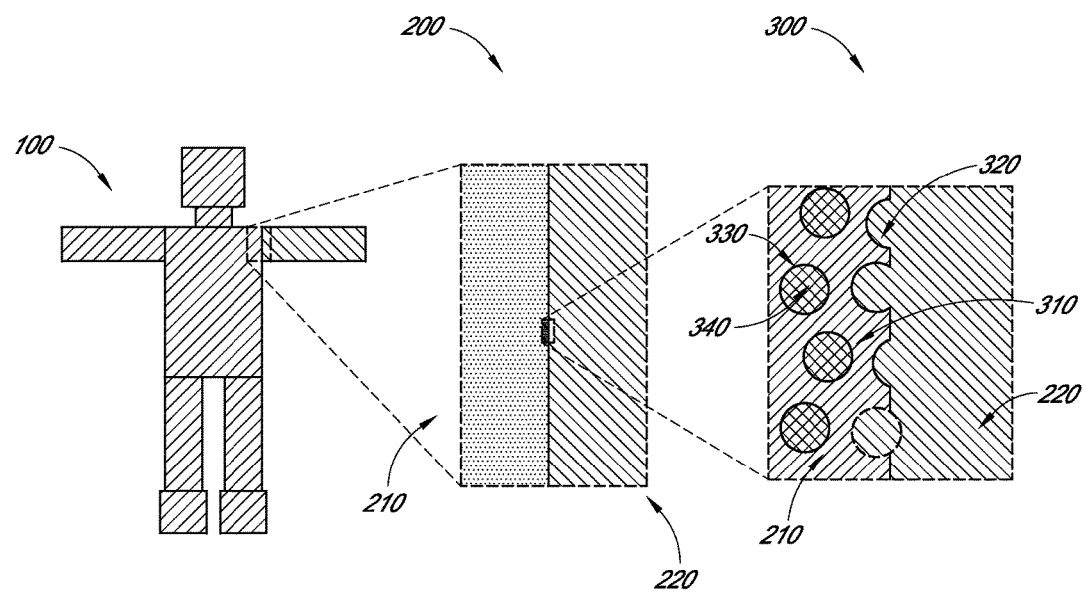
FIG. 1 shows a schematic diagram of an object formed using a feedstock according to some embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The present disclosure relates to a feedstock for additive manufacturing. The feedstock includes: a matrix material; one or more capsules disposed in the matrix material, wherein the one or more capsules are configured to be removable from at least a surface portion of the matrix material when the matrix material is solidified, to form one or more cavities in the surface portion.

The one or more capsules can include micro-scale capsules, nano-scale capsules or a mixture of both. In some embodiments, the one or more capsules include micro-scale capsules. For example, the micro-scale capsules may have an average diameter of about 1 µm to about 1000 µm. In some embodiments, the capsules include nano-scale capsules. For example, the nano-scale capsules may have an average diameter of about 10 nm to about 1000 nm. In some embodiments, the capsules include millimeter-scale capsules. For example, the millimeter-scale capsules may have an average diameter of about 1 mm to about 25 mm. In some embodiments, the one or more capsules include a mixture of micro-scale capsules, nano-scale capsules, and millimeter-scale capsules.

The one or more capsules can be disposed in the surface portion of the matrix material. In addition to the surface portion, the one or more capsules may be disposed in other portions of the matrix material. In some embodiments, the one or more capsules are disposed in at least the surface portion of the matrix material. In some embodiments, the one or more capsules are disposed below the surface portion of the matrix material. In some embodiments, the one or more capsules are disposed substantially uniformly throughout the matrix material.

The one or more capsules can include solid capsules, hollow capsules or a mixture of both. In some embodiments, the one or more capsules include solid capsules. In some embodiments, the one or more capsules include hollow capsules. In some embodiments, the one or more capsules include a mixture of hollow capsules and solid capsules.

The matrix material generally includes polymers. In some embodiments, the matrix material includes at least one thermoplastic polymer, at least one thermoset polymer, at least one photoactive polymer, or any combination thereof. In some embodiments, the thermoplastic polymer is polyphenylsulfone, acrylonitrile butadiene styrene, polycarbonate, polyamide, polyetherimide, polystyrene, or any combination thereof. In some embodiments, the thermoset polymer is polyvinylether, polyacrylate, epoxy resin, polyurethane, phenol-formaldehyde resin, melamine resin, polyamide, polyester, or any combination thereof. In some embodiments, the photoactive polymer is polyacrylate, polyvinylether, epoxy, acrylates, methacrylates, epoxides, or any combination thereof.

The matrix material may further include one or more additives. A variety of additives may be introduced to the matrix material. Several of these are listed below, grouped by how they affect the properties and/or ease of manufacturing of the matrix material.

Reinforcement materials are additives that improve the strength and mechanical properties of the material to which they are introduced. They include particles of various sizes (including microparticles and nanoparticles), fibers, whiskers, wires, and mesh. Common reinforcement materials for polymers include: glass (particularly glass fibers, such as fiberglass), carbon (for example, graphite), steel, aramids (for example, aramids produced by E. I. duPont de Nemours & Co., Inc., under the registered trademark Kevlar®), boron, silicon carbide, aluminum oxide, or any combination thereof.

Another type of additive includes materials that functionalize (for example, impart new functions, capabilities, or properties) to the matrix material. Feedstocks can be functionalized in a wide variety of ways, including improving the optical, thermal, and/or electrical properties of the feedstock. Optical additives include alumina, quartz, zircon, spinel, rutile, galena, barium titanate, zirconia, or any combination thereof. Thermal/electrical additives include carbon (in various forms), copper, gold, silver, aluminum, or any combination thereof.

Yet another type of additive includes materials that facilitate the manufacturing process by altering the properties of the feedstock. Some examples of this type of additive are plasticizers (which improve plasticity and flexibility), compatibilizers (which stabilize blends of two or more otherwise immiscible polymers), coupling agents (which form a bond between the polymer and any reinforcement structures that may be suspended within the feedstock), solvents, or any combination thereof.

In some embodiments, the one or more capsules include a sacrificial material. The sacrificial material can be any material that can be removed from at least the surface portion of the matrix material, for example, by contacting with a solvent or acid, or by exposure to light. When the one or more capsules are removed from the matrix material, they may form one or more cavities in the matrix material. In some embodiments, the sacrificial material is soluble in water, soluble in acid, soluble in an organic solvent, or any combination thereof. In some embodiments, the sacrificial material is soluble in water. In some embodiments, the sacrificial material is soluble in acid. The organic solvent and/or acid being used to remove the sacrificial structures/structure coatings is designed to remove the structure/coating without damaging the matrix material around it. In some embodiments, the sacrificial material is soluble in an organic solvent. In some embodiments, the sacrificial material is photosensitive. For example, the sacrificial material can decompose when exposed to ultra-violet light, infrared light or visible light. In some embodiments, the sacrificial material is a polar salt, a sugar, a gelatin, a soluble wax, or any combination thereof. In some embodiments, the sacrificial material is poly(propylene carbonate), polynorborene, polyimides, poly(benzoxazole)s, or any combination thereof. The sacrificial material may be a solid, or be of a consistency that can form cavities in the matrix material after removal.

The one or more capsules may be in the form of solid capsules having an outer coating encapsulating a core material such as a sacrificial material as described above. In some embodiments, the one or more capsules include a coating that encapsulates the sacrificial material. In some embodiments, the coating is inert to the matrix material and to the sacrificial material. The coating may be removed from the matrix material along with the sacrificial material, for example, in the same step in the manufacturing process. Methods of removing the coating may generally be similar to that of the sacrificial material as described above. In some embodiments, the coating is photosensitive. For example, the coating can decompose when exposed to ultra-violet light, infrared light or visible light. In some embodiments, the coating is soluble in water, soluble in acid, soluble in organic solvent, or a combination thereof. In some embodiments, the coating is soluble in acid. The organic solvent and/or acid being used to remove the sacrificial structures/structure coatings is designed to remove the structure/coating without damaging the matrix material around it. In some embodiments, the coating is soluble in an organic solvent. In some embodiments, the coating is soluble in water. The material of the coating may include materials capable of isolating the sacrificial material from the matrix material. In some embodiments, the coating includes a wax, a sugar, a gelatin, a cellulose, a polymer, or any combination thereof. The coating, in some embodiments, is of a different material from the sacrificial material.

The one or more capsules may be in the form of hollow capsules having an outer coating encapsulating a gas or vacuum. In some embodiments, the one or more capsules include at least one gas and a coating encapsulating the gas. The gas can for example be nitrogen gas, a noble gas such as helium or argon, or any gas that is inert to the matrix material and to the coating. In some embodiments, the one or more capsules include a coating encapsulating a vacuum. The coating for the gas or the vacuum may include one or more materials as described above for the coating that encapsulates the sacrificial material.

In some embodiments, the additive manufacturing process is a powder-based process, an extrusion-based process, or a liquid-vat process. In some embodiments, the powder-based processes are selected from is three-dimensional printing, laser sintering, or selective mask sintering. In some embodiments, the extrusion-based process is fused ion deposition modeling, multiphase jet solidification, or jetted photopolymer. In some embodiments, the liquid-vat process is stereolithography.

In some embodiments, the one or more capsules are inert to the matrix material, to one or more additives in the matrix material, or a combination thereof. The one or more additives in the matrix material can for example be those as described above.

The one or more capsules are generally configured to be inactive during depositing and solidifying of the matrix. In some embodiments, the one or more capsules do not melt at a melting temperature of the matrix material. In some embodiments, the one or more capsules do not decompose at a melting temperature of the matrix material. In some embodiments, the one or more capsules are configured to be impenetrable to a wavelength of light being used to polymerize the matrix material, for example, to avoid any decomposition of the one or more capsules by the wavelength of light during the polymerization. The polymerization can solidify the matrix material after its deposition.

In some embodiments, the amount, size, geometry, or any combination thereof, of the one or more capsules are dependent on the desired degree of surface roughness of the matrix material when solidified. For example, if the one or more cavities in the surface portion of the matrix material are intended to have a high degree of surface roughness (that is, a high vertical deviation from the surface), the one or more capsules may be larger in size. In some embodiments, the one or more capsules further include one or more reinforcement structures that extend between the matrix material and the one or more capsules, wherein the reinforcement structure remains extended from the matrix material after removal of the one or more capsules. The one or more reinforcement structures may include micro-scale fiber, nano-scale fiber or both. The reinforcement structure may include fibers that are made of a variety of fibers, wires and whiskers. Materials from which they can be made include, but are not limited to: glass, aramids (for example, Kevlar®), carbon, boron, silicon carbide, aluminum oxide, steel, molybdenum, tungsten, or any combination thereof.

Specific dimensions for the fibers will depend upon a multiplicity of factors, including the scale (for example, millimeter-scale, micro-scale, or nano-scale) of the particles themselves, the desired penetration depth into the matrix material around the sacrificial particles, and other related factors. The reinforcement structures can be characterized in terms of their diameter. Whisker reinforcements have diameters that are typically about 0.4 µm to about 2 µm. Fiber reinforcements have average diameters that are typically about 3 µm to about 20 µm. Whiskers and/or fibers are not typically characterized by length at this scale. However, for our purposes (for example, including fibers that are intended to stick out from the surface of the particles themselves), it may be noted that the fibers should be of a length that is substantially similar to or greater than the diameter of the sacrificial particles themselves (see above for appropriate ranges for particle diameter). For smaller sized objects to be formed by the feedstock, another particularly good reinforcement material is carbon nanotubes The present disclosure also relates to a method of bonding material layers in an additive manufacturing process. The method includes: forming a layer of a first feedstock having a first matrix material and one or more capsules disposed in the first matrix material; removing the one or more first capsules from at least a surface portion of the first matrix material when the matrix material is solidified, to form one or more cavities in the surface portion; and forming a layer of a second feedstock having a second matrix material, on at least a portion of the first matrix material, wherein prior to solidification of the second matrix material, the second matrix material at least partially infiltrates the one or more cavities in the surface portion of the first matrix material. The infiltration of the second matrix material into the one or more cavities can advantageously strengthen the bond between the first matrix material and the second matrix material.

In some embodiments, the second feedstock further includes one or more second capsules disposed in the second matrix material. Like for the first feedstock, the one or more second capsules can be removed from at least a surface portion of the second matrix material to form one or more cavities in the surface portion. This can then prepare the second matrix material for receiving an additional layer of matrix material that may at least partially infiltrate the one or more cavities to strengthen bonding of the additional layer of matrix material to the second matrix material. It will be appreciated that further layers of matrix materials can be added using similar methods.

The first matrix material and second matrix material may be of the same material or may be of different materials. The first matrix material and the second matrix material may have compatible mechanical properties, thermal properties, or both. The first matrix material and the second matrix material may be chemically inert to each other. Examples of suitable matrix materials include those as described above. The one or more first capsules and the one or more second capsules may be of the same material or may be of different materials. Examples of suitable matrix materials and capsules include those as described above.

The forming of the layers of feedstocks, for example one or both of the layer of the first feedstock and the layer of the second feedstock, may be performed by additive manufacturing processes as described above, for example, powder-based processes, extrusion-based processes or liquid-vat processes. Removing of the one or more capsules from the matrix material, for example from the surface portion of the first matrix material, may be performed by methods described above such as by contacting the one or more capsules with an acid, a solvent or light, depending on the material of the capsules.

In some embodiments, one or both of the first feedstock and the second feedstock further includes a binder. For example, where the matrix material is configured for powder-based additive manufacturing, the binder can bind the powders in the matrix material. Binder materials for 3D Printing include a wide variety of general adhesives, which vary based upon their compatibility with the chosen powder material. Some common adhesive materials include: polyurethanes, polysiloxanes (for example, silicones), epoxies, polyimides, acrylics, rubbers, or any combination thereof. Many 3D printing processes make use of specialized binders that go only by trade names, such as Z-Corp's ZB 60 binder material.

The matrix material, including one or both of the first matrix material and the second matrix material, may be as described above and may include at least one thermoplastic polymer, at least one thermoset polymer, at least one photoactive polymer or any combination thereof as described above.

In some embodiments, the first feedstock further includes one or more reinforcement structures that extend between the first matrix material and the one or more first capsules, wherein the reinforcement structure remains extended from the first matrix material after removal of the one or more first capsules. After the layer of the second feedstock is deposited on the first matrix material, the second matrix material may infiltrate the one or more cavities formed by the removal of the one or more capsules. Accordingly, the one or more reinforcement structures extend between the first matrix material and the second matrix material after forming the layer of the second feedstock. The one or more reinforcement structures may be as described above, for example micro-scale fiber, nano-scale fiber or both as described above.

This disclosure further relates to a method of making one or more capsules, for example, for disposing into a matrix material of a feedstock used in additive manufacturing. The method includes: forming a sacrificial material into one or more particles; and coating the one or more particles with a coating material. In some embodiments, the forming of the sacrificial material into one or more particles includes photolithography, grinding, chemical synthesis, or any combination thereof. In some embodiments, coating the one or more particles includes coating by pan-coating, air-suspension coating, spray drying, interfacial polycondensation, in-situ polymerization, or any combination thereof. In some embodiments, the one or more particles include micro-scale particles, nano-scale particles or both. The sizes of the coated micro-scale particles and the coated nano-scale particles may be above for the micro-scale capsules and the nano-scale capsules. The method may further include forming reinforcement structures on the one or more particles, the coating material or both, by spray-drying, pan-coating, in-situ polymerization, stereolithography of fiber-resin mixtures, inkjet printing, or by growing dendrimers from the particles, the coating material or both.

This disclosure also relates to a method of making a feedstock for additive manufacturing. The method includes: mixing one or more capsules into a matrix material, wherein the one or more capsules are configured to be removable from a surface portion of the matrix material when the matrix material is solidified, to form one or more cavities in the surface portion. The mixing step may be performed at various stages of the additive manufacturing process. In some embodiments, the mixing is performed before the feedstock is fed into an additive manufacturing extruder. In some embodiments, the mixing is performed during the feeding of the feedstock into the additive manufacturing extruder. In some embodiments, the mixing is performed in the additive manufacturing extruder. Where the mixing is performed in the additive manufacturing extruder, the one or more capsules and the matrix material can be fed into the additive manufacturing extruder separately.

This disclosure also relates to a three-dimensional object. The three-dimensional object includes: a first matrix material as described above; and a second matrix material as described above on at least a portion of the first matrix material, wherein the first matrix material has a surface comprising one or more cavities that are at least partially infiltrated by the second matrix material. The object may further include one or more reinforcement structures as described above that extend between the first matrix material and the second matrix material in the one or more cavities.

FIG. 1 shows a schematic diagram of an exemplary three-dimensional object 100 formed using a feedstock according to some embodiments. For the purpose of illustration, FIG. 1 shows magnified views 200 and 300 of at least two layers of the feedstock at a joining portion of the three-dimensional object, for example, where an arm joins to a body of a printed figurine. The feedstock may include one or more capsules, such as capsules having a sacrificial material encapsulated with an outer coating. The first layer 210 of feedstock includes a capsule-embedded first matrix material and the second layer 220 of feedstock includes a connecting second matrix material. The view 200 shows a magnified view of the capsule-embedded first matrix material 210 and the connecting second matrix material 220. The view 300 shows a magnified view of the capsules 310 and the joining interface between the capsule-embedded first matrix material 210 and the connecting second matrix material 220. As described above, the capsules 310 may include a sacrificial material 340 and an outer coating 330. After the outer coating 330 and the sacrificial material 340 of the capsules on an outer surface of the first layer have been destroyed, cavities 320 are left in the first matrix layer. The cavities 320 can be infiltrated by the connecting second matrix material, thereby strengthening the bond between the two layers.

Figure 2:
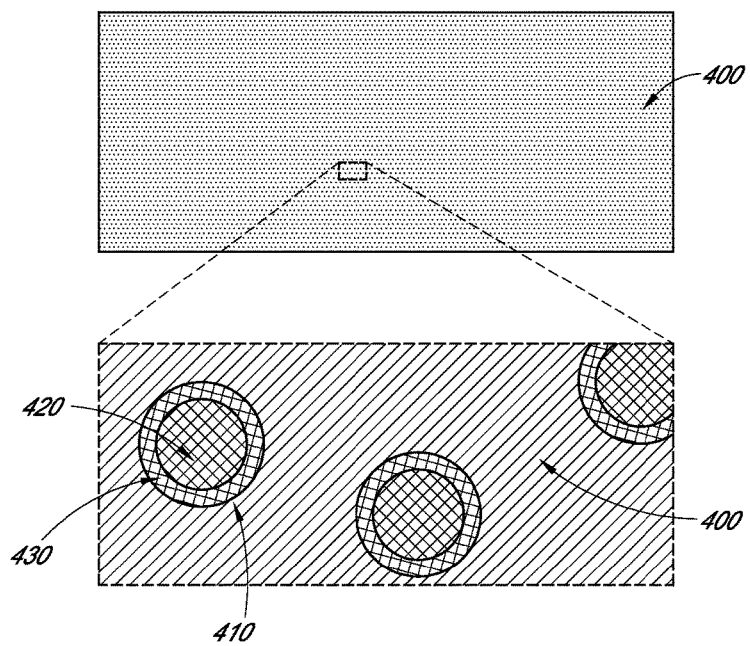
FIG. 2 shows a schematic diagram of a matrix material containing capsules that are made of polymer-coated sodium chloride particles in accordance with some embodiments.

FIG. 2 shows a schematic diagram of an exemplary feedstock having a matrix material 400 and capsules 410 disposed in the matrix material 400. The capsules 410 can be made of coated particles in accordance with some embodiments, and may include a sacrificial material 420, encapsulated by an outer coating 430. The capsules 410 can be embedded in the matrix material 400 either at a surface portion or uniformly throughout the matrix material 400.

FIGS. 3A to 3E show an exemplary process of bonding material layers in accordance with some embodiments.

Figure 3A:
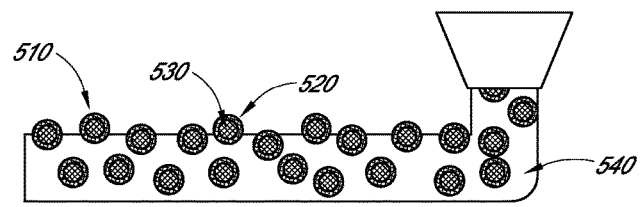
FIGS. 3A to 3E show a process of bonding material layers in accordance with some embodiments.

Referring to FIG. 3A, a layer of a first feedstock is deposited. The first feedstock includes a first matrix material 540 and one or more first capsules 510 disposed in the first matrix material 540. The one or more first capsules 510 include a sacrificial material 530 and a coating material 520 that encapsulates the sacrificial material 530.

Figure 3B:
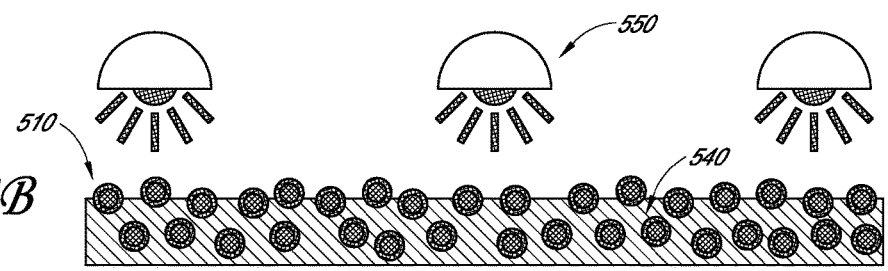

FIG. 3B shows the removal of the one or more first capsules 510 from at least a surface portion of the first matrix material 540 by exposure to a light source 550. The first capsules 510 in this case can be made of a photosensitive material. After the removal, cavities 580 (see FIG. 3D) can be formed in the surface portion of the first matrix material 540.

Figure 3C:
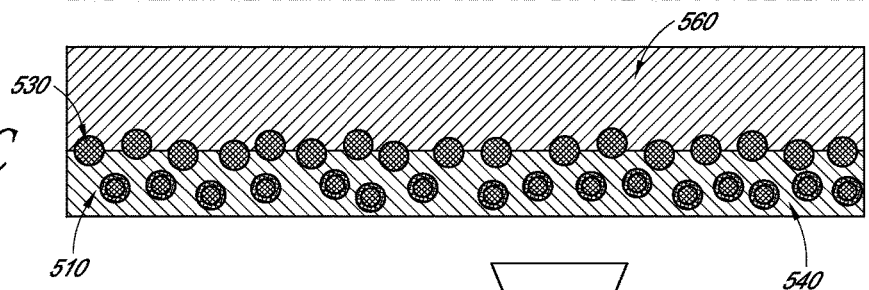

FIG. 3C shows the removal of the one or more first capsules 510 from at least a surface portion of the first matrix material 540 by exposure to a removing agent 560 such as a solvent or an acid. The first capsules 510 in this case may be made of materials that can dissolve or decompose in the removing agent 560. After the removal, cavities 580 (see FIG. 3D) can be formed in the surface portion of the first matrix material 540.

Figure 3D:
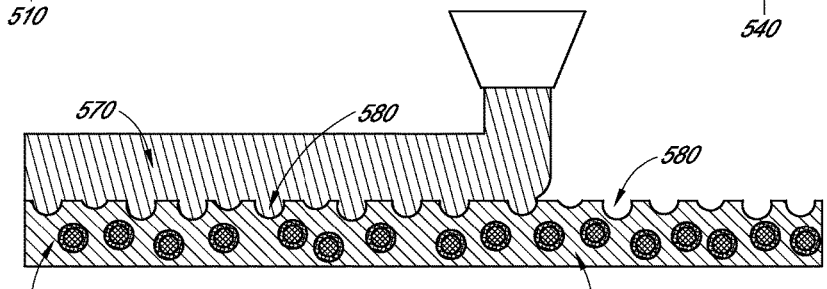
Figure 3E:
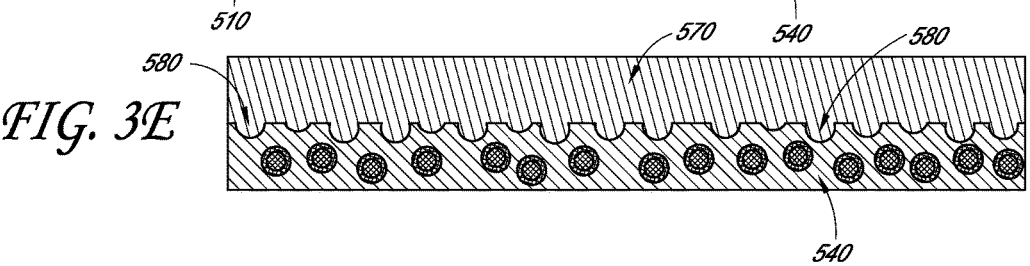

FIG. 3D shows that after removing the first capsules 510 from the surface portion of the first matrix material 540, cavities 580 can be formed in the surface portion of the first matrix material 540. FIG. 3D also shows forming a layer of a second feedstock having a second matrix material 570, on at least a portion of the first matrix material 540, wherein prior to solidification of the second matrix material 570, the second matrix material 570 at least partially infiltrates the one or more cavities 580 in the surface portion of the first matrix material 540. FIG. 3E shows that the second matrix material 570 at least partially infiltrates the one or more cavities 580 in the surface portion of the first matrix material 540.

Figures 4A, 4B, 4C:
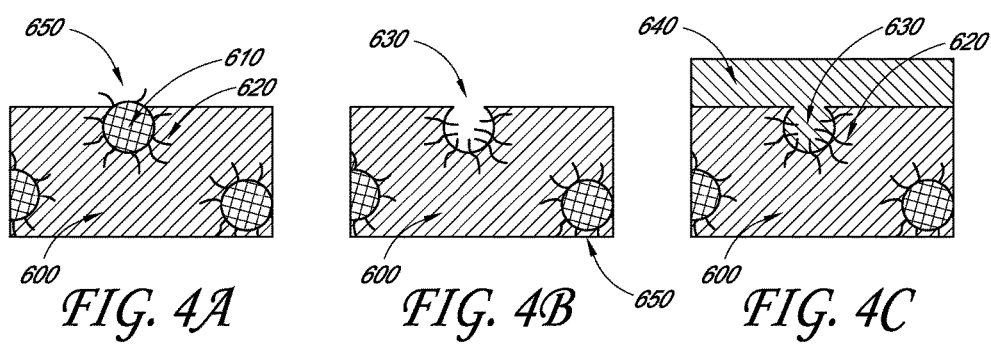
FIGS. 4A to 4C show a process of bonding material layers wherein one of the material layers contain reinforcement structures in accordance with some embodiments.

FIGS. 4A to 4C show a process of bonding material layers wherein one of the material layers contain reinforcement structures in accordance with some embodiments.

FIG. 4A shows a first feedstock having a first matrix material 600 and one or more first capsules 650. The first capsules include a sacrificial material 610 and reinforcement structures 620 extending from the sacrificial material. The reinforcement structures 620 can be fibers such as carbon or glass fibers. FIG. 4B shows the removal of the first capsules 650 from the surface portion of the first matrix material 600 to form cavities 630 in the surface portion. Removing of the first capsules 650 from the matrix material 600 from the surface portion of the first matrix material 600 may be performed by contacting the one or more capsules with an acid, a solvent, or light, depending on the material of the capsules.

FIG. 4C shows the forming of a layer of a second feedstock having a second matrix material 640, on at least a portion of the first matrix material 600, wherein prior to solidification of the second matrix material 640, the second matrix material 640 at least partially infiltrates the one or more cavities 630 and engages the reinforcement structures 620 in the surface portion of the first matrix material 600. The reinforcement structures 620 can further reinforce adhesion between the first matrix layer and the second matrix layer by acting as an anchor between the two layers.

Comparative Benefits and Advantages

The feedstocks disclosed herein provide several benefits and advantages:
- The one or more cavities formed in the matrix material after removing the one or more capsules can improve engagement between layers of matrix material and can therefore create strong, seamless mechanical bonds between these layers. This is especially true in embodiments where different materials are used for the matrix material and the connecting material.
- The capsules in the disclosed feedstocks can be removed with a high degree of selectivity, thereby facilitating precise control of the surface roughness of the surface of the matrix material.
- The disclosed feedstocks can have little to no negative effect on the mechanical properties of the finished product. This can be accomplished by using sacrificial materials with substantially similar mechanical properties and failure characteristics to the surrounding matrix material.
- The disclosed feedstocks can have little to no negative effect on the chemical properties of the finished product. This can be accomplished by avoiding sacrificial materials/coatings that compromise or are otherwise chemically reactive to any of the other chemical compounds in the feedstock.
- The disclosed feedstocks can have little to no negative effect on the thermal properties of the finished product. This can be accomplished by using sacrificial materials/coatings that have substantially similar thermal properties to the matrix polymer. For instance, a conductive sacrificial material should not be used in an insulating polymer (and vice versa) unless that is the intended effect.
- The disclosed feedstocks can have little to no negative effect on the tactile properties of the finished product. This can be accomplished by using additional second matrix materials to smooth the outer surface of the manufactured object in the event of a void, indentation or crater.
- The disclosed feedstocks can have little to no negative effect on the optical properties of the finished product. This can be accomplished by index matching the sacrificial material(s) with the matrix material, and/or using very small (for example, micro- or nano-scale) sacrificial capsules/particles to facilitate the passage of light through the matrix.
- The disclosed feedstocks can be readily applicable to a wide variety of current additive manufacturing processes and devices, and require minimal innovation and development to make them market-ready.
- The disclosed feedstocks can make use of widely available materials and material removal processes, which makes them simple and inexpensive to implement.

EXAMPLES

Example 1

Fabrication of Feedstock Containing Polymer-Coated Sodium Chloride Micro-Scale Capsules The present example describes fabrication of a feedstock containing the sodium chloride micro-scale capsules.

A 10% by volume mixture of sodium chloride was obtained. Each micro particle had a diameter of 50 micrometers. Then, each micro particle was spray coated with a photosensitive polyimide via a spray drying machine. The micro-scale particles were added to Stratasys polycarbonate-acrylonitrile butadiene styrene (PC-ABS) polymer to form a feedstock that included 90 vol % PC-ABS and 10 vol % micro-scale capsules.

This example teaches the fabrication of a feedstock including sodium chloride micro-scale capsules coated with photosensitive polyimide in a PC-ABS matrix material.

Example 2

A Method of Bonding Two Layers of Feedstock

The present example describes a method of bonding layers in an additive manufacturing process.

A first feedstock was provided. The feedstock included 90 vol % PC-ABS and 10 vol % micro-scale capsules, which include micro-scale sodium chloride particles coated with photosensitive polyimide. Fused deposition modeling was used to deposit the first feedstock onto the build platform of the FDM machine for the first layer, with successive layers being deposited atop the first at a rate of 1000 mm$^3$/minute. The surface portion of the matrix material formed the surface portion of the first material layer. Some of the micro-scale capsules were exposed on the surface portion of the first material layer. The surface portion was exposed to ultraviolet light until the photosensitive polyimide coating of the sacrificial microcapsules on the surface portion of the manufactured object was etched away, which dissolved the photosensitive polyimide coating and exposed the micro-scale sodium chloride particles on the surface portion. The manufactured object was then soaked in a water bath until the sodium chloride particles within the surface portion of the manufactured object completely dissolved, leaving cavities on the surface portion of the object. A second polycarbonate feedstock was provided. Fused deposition modeling was again used to deposit the second feedstock onto the surface portion of the first material layer, such that the cavities were infiltrated with polycarbonate. Upon solidification, the bond between the first material and the second material was strengthened because the second polycarbonate layer had partially infiltrated the first PC-ABS layer.

This example teaches that the bond between material layers in an additive manufacturing process can be strengthened by using a feedstock including micro-scale capsules and a matrix material.

Example 3

Fabrication of a Feedstock for a Stereolithography (SL) Apparatus

The present example describes fabrication of a feedstock including a photosensitive resin and polymer-coated fiber bundles for a stereolithography (SL) apparatus.

Carbon fiber bundles (7 µm in diameter) were coated with polyvinyl alcohol (PVA) via in-situ polymerization. The fibers were added to 3DSystems' Somos 18420 to form a composite that included 85 vol % resin to 15 vol % fibers.

This example teaches the fabrication of a feedstock including carbon fiber bundles coated with PVA in a Somos 18420 (photopolymer resin) matrix material.

Example 4

Method of Bonding Two Layers of Different Feedstock Material

The present example describes a method of bonding two layers of different feedstock material in an additive manufacturing process.

A 90 vol % PVA and 10 vol % micro-scale capsules feedstock was prepared. Sodium chloride microparticles, with diameters of approximately 50 micrometers, were obtained. Then, each micro particle was spray coated with a photosensitive polyimide via a spray drying machine. The micro-scale particles were added to PVA to form a liquid feedstock that included 90 vol % PVA and 10 vol % micro-scale capsules.

The stereolithography apparatus was provided. The feedstock was used to form a first layer, which was cured with an ultraviolet laser. The PVA and sodium chloride were washed from the surface portion of the first layer with a water bath, leaving behind hollow cavities. RenShape 7820, a photopolymer resin, was used to form a second layer atop the first layer, filling the cavities on the surface of the first layer. The second layer was cured atop the first layer with an ultraviolet laser.

This example teaches that the bond between two layers of different materials in a 3-D object can be strengthened using a feedstock including sacrificial micro particles.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," and so on). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, and so on" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, and so on). In those instances where a convention analogous to "at least one of A, B, or C, and so on" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, and so on). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and so on. As a non-limiting example, each range discussed herein can be readily broken down into a lower third, middle third and upper third, and so on. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A feedstock for additive manufacturing, the feedstock comprising:
    a matrix material; and
    one or more capsules disposed in the matrix material,
    wherein the one or more capsules are configured to be removable from at least a surface portion of the matrix material when the matrix material is solidified, to form one or more cavities in the surface portion, and wherein the one or more capsules comprise at least one of a sacrificial material, a gas, or a vacuum and a coating that encapsulates the sacrificial material, gas, or vacuum.

2. The feedstock of claim 1, wherein the one or more capsules comprise nano-scale capsules having an average diameter of about 10 nm to 1000 nm, micro-scale capsules having an average diameter of about 1 μm to 1000 μm, or both, wherein the one or more capsules are disposed in at least the surface portion of the matrix material, wherein the one or more capsules comprise solid capsules, hollow capsules, or both, and wherein the matrix material comprises at least one thermoplastic polymer, at least one thermoset polymer, at least one photoactive polymer, or any combination thereof.

3. The feedstock of claim 1, wherein the one or more capsules are disposed substantially uniformly throughout the matrix material.

4. The feedstock of claim 2, wherein the thermoplastic polymer is polyphenylsulfone, acrylonitrile butadiene styrene, polycarbonate, polyamide, polyetherimide, polystyrene, or any combination thereof, wherein the thermoset polymer is polyvinylether, polyacrylate, epoxy resin, polyurethane, phenol-formaldehyde resin, melamine resin, polyamide, polyester, or any combination thereof, and wherein the photoactive polymer is polyacrylate, polyvinylether, epoxy, acrylate, methacrylate, epoxide, or any combination thereof.

5. The feedstock of claim 1, wherein the sacrificial material and the coating both are soluble in water, soluble in acid, soluble in an organic solvent, or any combination thereof.

6. The feedstock of claim 1, wherein the sacrificial material and the coating both are photosensitive.

7. The feedstock of claim 1, wherein the sacrificial material is polar salt, sugar, gelatin, soluble wax, or any combination thereof.

8. The feedstock of claim 1, wherein the sacrificial material is poly(propylene carbonate), polynorborene, polyimide, poly(benzoxazole), or any combination thereof.

9. The feedstock of claim 1, wherein the coating comprises wax, sugar, gelatin, cellulose, polymers, or any combination thereof.

10. The feedstock of claim 1, wherein the coating is configured to isolate the matrix material from the sacrificial material, gas, or vacuum.

11. The feedstock of claim 1, wherein the additive manufacturing is a powder-based processes, an extrusion-based process or a liquid-vat process.

12. The feedstock of claim 11, wherein the powder-based process is three-dimensional printing, laser sintering, or selective mask sintering, wherein the extrusion-based process is fused deposition modeling, multiphase jet solidification, or jetted photopolymer, and wherein the liquid-vat process is stereolithography.

13. The feedstock of claim 1, wherein a melting temperature of the one or more capsules is different than a melting temperature of the matrix material and wherein the one or more capsules are configured to be impenetrable to a wavelength of light that polymerizes the matrix material.

14. The feedstock of claim 1, further comprising one or more reinforcement structures that extend between the matrix material and the one or more capsules, wherein the reinforcement structure remains extended from the matrix material after removal of the one or more capsules, and wherein the one or more reinforcement structures comprise micro-scale fiber having an average diameter of about 1 μm to 1000 μm, nano-scale fiber having an average diameter of about 10 nm to 1000 nm, or both.

15. A method of making a feedstock for additive manufacturing, the method comprising:
    covering one or more capsules with a coating, wherein the one or more capsules include at least one of a sacrificial material, a gas, or a vacuum and the coating encapsulates the sacrificial material, gas, or vacuum;
    mixing the one or more capsules with a matrix material; and
    feeding the one or more capsules and matrix material into an additive manufacturing extruder, wherein the one or more capsules are configured to be removable from a surface portion of the matrix material when the matrix material is solidified, to form one or more cavities in the surface portion.

16. The method of claim 15, wherein the mixing is performed before feeding the one or more capsules and matrix material into the additive manufacturing extruder.

17. The method of claim 15, wherein the mixing is performed while feeding the one or more capsules and matrix material into the additive manufacturing extruder.

18. The method of claim 15, wherein the mixing is performed in the additive manufacturing extruder.

19. The method of claim 15, wherein the one or more capsules and the matrix material are fed into the additive manufacturing extruder separately.

20. The feedstock of claim 1, wherein the coating is configured to release the sacrificial material, gas, or vacuum during removal of the one or more capsules from the surface portion of the matrix material.

21. The method of claim 15, wherein the one or more capsules include one or more reinforcement structures extending from the one or more capsules.

22. A feedstock for additive manufacturing, the feedstock comprising:
   a matrix material;
   one or more capsules disposed in the matrix material; and
   one or more reinforcement structures that extend between the matrix material and the one or more capsules,
   wherein the one or more capsules are configured to be removable from at least a surface portion of the matrix material when the matrix material is solidified, to form one or more cavities in the surface portion.

23. The feedstock of claim 22, wherein the one or more reinforcement structures comprise micro-scale fiber having an average diameter of about 1 μm to 1000 μm, nano-scale fiber having an average diameter of about 10 nm to 1000 nm, or both.

24. The feedstock of claim 22, wherein the reinforcement structure remains extended from the matrix material after removal of the one or more capsules.

* * * * *

UNITED STATES PATENT AND TRADEMARK OFFICE
CERTIFICATE OF CORRECTION

PATENT NO. : 10,144,152 B2
APPLICATION NO. : 15/508416
DATED : December 4, 2018
INVENTOR(S) : Rothfuss Page 1 of 1

It is certified that error appears in the above-identified patent and that said Letters Patent is hereby corrected as shown below:

In the Claims

Column 14, Line 33, In Claim 11 delete "processes" and insert -- process -- therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*